May 23, 1967     F. W. JOHNSON     3,321,218
BRANCH DUCT CONFIGURATION OF A FLUID SYSTEM
Filed Oct. 27, 1964

*INVENTOR.*
FREDERICK W. JOHNSON
BY Moody & Hallacher
ATTORNEYS

United States Patent Office 3,321,218
Patented May 23, 1967

3,321,218
BRANCH DUCT CONFIGURATION OF A
FLUID SYSTEM
Frederick W. Johnson, Cedar Rapids, Iowa, assignor to Collins Radio Company, Cedar Rapids, Iowa, a corporation of Iowa
Filed Oct. 27, 1964, Ser. No. 406,700
4 Claims. (Cl. 285—155)

This invention relates generally to a fluid duct system and particularly to a branch duct entrance configuration.

The usual system for connecting a branch duct to a main duct in a fluid system consists of merely inserting an aperture of the proper configuration in the main duct and abutting the branch duct at right angles to the axis of the main duct. Such systems suffer the inherent disadvantage of a turbulent region downstream and, in some instances upstream from the branch duct. It is therefore an object of this invention to supply a branch duct entrance configuration which eliminates the downstream and upstream turbulent regions.

It is a further object of this invention to provide such an entrance configuration with a divergent portion allowing expansion of the fluid and thereby eliminating said turbulent regions.

Further objects, features and advantages of the invention will become apparent from the following description and claims when read in view of the accompanying drawing wherein like numbers indicate like parts and in which:

Figure 1:
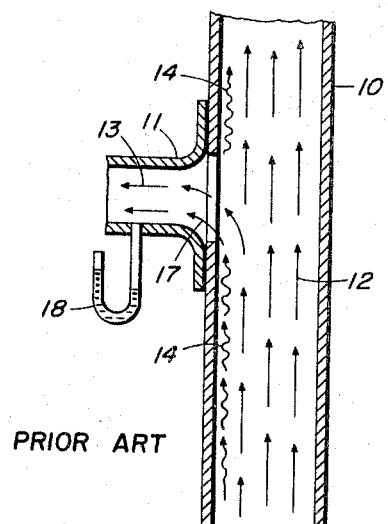
FIGURE 1 is a cross-sectional view of a prior art system.

FIGURE 1 shows a main duct 10 having a branch duct 11 connected at right angles thereto. Main duct 10 is provided with an aperture 17 having the same configuration as the cross-section of the branch duct 11. The longitudinal axis of the branch duct 11 is at approximately right angles to the main duct 10. Fluid 12, flowing through main duct 10, has a portion 13 diverted into the branch duct 11. The diverting fluid entering the branch duct 13 must suffer a change in angular direction when entering the branch duct. This change causes a turbulent region 14 to be formed downstream and upstream from the branch duct. The turbulent regions prohibit a smooth and uniform fluid distribution along both the main duct and the branch duct.

Figure 2:
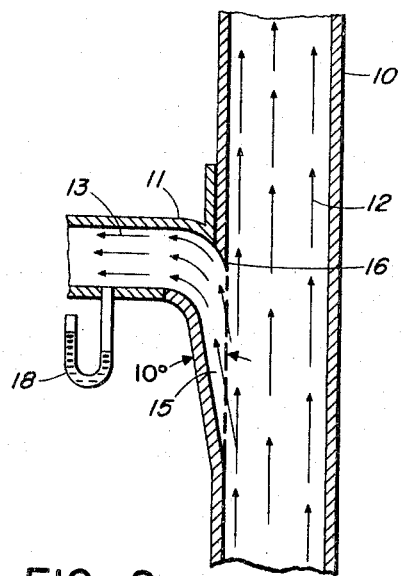
FIGURE 2 is a cross-sectional view of the inventive system.

Referring now to FIGURE 2, which shows a main duct 10 and a branch duct 11, it is noted that the entrance to the branch duct is slightly diverted to form an expansion region 15. The entrance to the branch duct is also provided with a downstream director 16 which is flush with the side of the main duct 10. The fluid director 16 can be formed from the branch duct and main duct as shown in FIGURE 2 or it can be formed from a single piece of machined material. As fluid 12 flows down main duct 10 and approaches the expansion region 15 the portion of the fluid to be diverted into branch duct 11 is permitted to expand before entering the branch duct. This provides a diffusion zone for the required velocity change as the fluid enters the branch duct 11. The director 16 acts as a blade to separate the diverted fluid from that continuing down the main duct 10. It is therefore seen that the turbulent regions 14 shown in FIGURE 1 are thereby eliminated. FIGURE 2 shows that expansion region 15 is formed by placing a portion of the main duct wall at an angular displacement from the longitudinal axis of the main duct 10. The angle shown is 10° but can be from 1° to 12° depending upon design considerations. The angle must be such that it permits the retention of the boundary layer between the fluid and the duct wall. This requires keeping the angle between 1° and 12°. The use of small angles such as 1° or 2° requires a sufficiently long run between branch ducts to enable placing the vertex of the angle upstream from the preceding branch duct. This, of course, is a design consideration dependent upon the room available between branch ducts. The angle cannot greatly exceed 12° because, obviously, as the angle increases it approaches 90° and thereby approaches the prior art configuration of FIG. 1. It is therefore important that the angle be approximately 10° to keep the fluid boundary layer attached to the duct wall in preparation for entry into the branch. The director 16 is important in that it provides a continuous path for the fluid flow. The absence of director 16 would create a wall for some of the incoming fluid to collide with and thereby cause a significant area of turbulence.

The invention is seen to eliminate turbulence in the duct system by the provision of the angular deviation of the main duct side wall to thereby provide for the retention of the boundary layer between the duct wall and the diverted gases; and also by the provision of director 16 which permits the existance of a boundary layer immediately downstream from a branch duct while eliminating a wall with which the fluid can collide. The elimination of the turbulent portion permits a uniform fluid distribution across the branch duct 11. This is important and valuable as it enables the accurate prediction of fluid flow and pressure along the branch duct. It is also possible in some instances to realize a substantial decrease of horsepower required at the fluid source. The decrease of horsepower required at the fluid source. The decrease of horsepower results in a reduction of system noise.

The branch duct entrance configuration is applicable to fluid systems irrespective of the cross-sectional configuration of the ducts. It should also be noted that any number of branch ducts can be placed along the main duct length.

Although this invention has been described with respect to a particular embodiment thereof, it is not to be so limited, as changes and modifications may be made therein which are within the spirit and scope of the invention as defined by the appended claims.

I claim:
1. A fluid duct system for circulating an expansible fluid comprising: a main duct and a branch duct mounted at an angle on said main duct, an expansion region in said main duct contiguous with said branch duct, and a fluid director forming a portion of the inner surfaces of said main duct and said branch duct to provide a smooth transitional surface extending from the inner surface of said main duct into said branch duct, said fluid director extending into the entrance of said branch duct to provide a continuous fluid path in conjunction with said expansion region, said fluid director portion of said main duct being parallel to and in alignment with the downstream portion of said main duct to provide a substantially turbulent-free duct system.

2. The system of claim 1 wherein said expansion region is on the upstream side of said branch duct.

3. The system of claim 2 wherein said expansion region diverges from the main duct wall at angle of about 1° to 12°.

4. The system of claim 2 wherein said angle is 10°.

(References on following page)

References Cited by the Examiner

UNITED STATES PATENTS

| | | | |
|---|---|---|---|
| 388,616 | 8/1888 | Bailey | 285—121 |
| 1,091,625 | 3/1914 | Briney | 285—156 X |
| 1,275,532 | 8/1918 | Conran | 285—121 |
| 1,282,561 | 10/1918 | Foley | 285—156 X |
| 1,305,086 | 5/1919 | Fryer | 285—153 X |
| 1,969,043 | 8/1934 | Sharp | 285—121 |
| 2,293,796 | 8/1942 | Bestor | 285—150 X |
| 3,116,756 | 1/1964 | Alderson | 285—156 X |

FOREIGN PATENTS 350,511   1/1961   Switzerland.

CARL W. TOMLIN, *Primary Examiner.*

D. W. AROLA, *Assistant Examiner.*